3,007,934
TERTIARY ALCOHOLS
William Laszlo Bencze, Summit, N.J., assignor to Ciba Pharmaceutical Products, Inc., Summit, N.J., a corporation of New Jersey
No Drawing. Filed Jan. 15, 1960, Ser. No. 2,570
12 Claims. (Cl. 260—296)

The present invention concerns tertiary alcohols and derivatives thereof. More particularly, it relates to compounds of the formula:

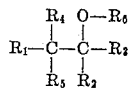

in which at least one of the radicals $R_1$ and $R_2$ represents a heterocyclic aryl radical, and the other a heterocyclic aryl radical or a carbocyclic aryl radical, $R_3$ stands for a monocyclic carbocyclic aryl radical, substituted by a group of the formula —O—A—Z, in which Z represents a tertiary amino group and A as lower alkylene radical, each of the radicals $R_4$ and $R_5$ represents hydrogen or lower alkyl, $R_6$ stands for hydrogen or acyl, salts, quaternary ammonium compounds or N-oxides thereof, as well as process for the preparation thereof.

A heterocyclic aryl radical $R_1$ or $R_2$ represents a bicyclic, or primarily a monocyclic heterocyclic aryl radical, the hetero atom of which may be nitrogen. One or more hetero atoms, particularly nitrogen atoms, may form part of the heterocyclic nucleus. Preferred are monocyclic heterocyclic aryl radicals, which contain one or two nitrogen atoms as members of the heterocycle. Such radicals are primarily monocyclic mono-aza-cyclic aryl, e.g. 2-pyridyl, 3-pyridyl or 4-pyridyl radicals; monocyclic diaza-cyclic aryl, e.g. 3-pyridazinyl, 2-pyrimidyl, 4-pyrimidyl, 2-pyrazinyl and the like, represent groups with two nitrogen atoms as members of the heterocyclic nucleus. The heterocyclic radical is preferably unsubstituted; possible substituents may be, for example, lower alkyl, e.g. methyl, ethyl and the like, lower alkoxy, e.g. methoxy, ethoxy and the like, halogen, e.g. chlorine, bromine and the like, or any other suitable substituents.

Whenever only one of the radicals $R_1$ and $R_2$ is represented by a heterocyclic aryl radical, the other radical stands for a carbocyclic aryl radical, particularly a monocyclic carbocyclic aryl radical, which may be unsubstituted or substituted by lower alkyl, e.g. methyl, ethyl and the like, lower alkoxy, e.g. methoxy, ethoxy and the like, lower alkylenedioxy, e.g. methylenedioxy, lower alkyl-mercapto, e.g. methylmercapto, ethylmercapto and the like, nitro, amino, such as N,N-di-substituted amino, for example, N,N-di-lower alkyl-amino, e.g. N,N-dimethylamino and the like, halogeno, e.g. fluoro, chloro, bromo and the like, or polyhalogeno-lower alkyl, e.g. trifluoromethyl. These substituents may be attached to any of the available positions, whereby one or more than one of the same or of different substituents may be present.

The monocyclic carbocyclic radical $R_3$ is substituted by a tertiary amino-lower alkoxy group of the formula —O—A—Z, which may be located in any of the available positions, but substitutes preferably the 4-position.

In a tertiary amino-lower alkyl radical of the formula —A—Z, the N,N-di-substituted amino group Z is particularly an N,N-di-lower hydrocarbon-amino, an N,N-alkylene-imino, an N,N-oxa-alkylene-imino, an N,N-thia-alkylene-imino or an N,N-aza-alkylene-imino group. Lower hydrocarbon radicals of an N,N-di-lower hydrocarbon-amino group are, for example, lower alkyl, lower alkenyl, cycloalkyl containing from five to six ring carbon atoms, carbocyclic aryl, carbocyclic aryl-lower alkyl, radicals. Such radicals are, for example, methyl, ethyl, propyl, isopropyl, butyl, isobutyl, pentyl, neopentyl, allyl, methallyl, cyclopentyl, cyclohexyl, phenyl, benzyl, 1-phenylethyl, 2-phenylethyl and the like. Therefore, N,N-di-lower hydrocarbonamino groups are particularly represented by N,N-di-lower alkyl-amino, e.g. N,N-dimethylamino, N - ethyl - N-methyl-amino, N,N-diethylamino, N,N-dipropylamino, N,N-diisopropylamino and the like, as well as by N-cycloalkyl-N-lower alkyl-amino, e.g. N - cyclopentyl - N-methyl-amino, N-cyclohexyl-N-methyl-amino and the like, N-lower alkyl-N-phenyl-lower alkyl-amino, e.g. N-benzyl-N-methyl-amino, N-methyl-N-(2-phenylethyl)-amino and the like, or any other N,N-di-substituted amino group. The alkylene portion of N,N-alkylene-imino contains preferably from four to six carbon atoms; the radical may be represented by 1-pyrrolidino radicals, e.g. 1-pyrrolidino, 2-methyl-1-pyrrolidino and the like, 1-piperidino radicals, e.g. 1-piperidino, 2-methyl-1-piperidino, 3-methyl-1-piperidino, methyl-1-piperidino, 3-hydroxy-1-piperidino, 3-acetoxyl-1-piperidino, 3-hydroxymethyl-1-piperidino, and the like or 1-hexamethyleneimino or similar radicals. N,N-oxa-alkylene-imino, N,N-thia-alkylene-imino and N,N-aza-alkylene radicals contain preferably four carbon atoms in the alkylene portion and may be represented by 1-morpholino, 1-thiamorpholino, or by 1-piperazino radicals, e.g. 4-methyl-1-piperazino, 4-(2-hydroxyethyl)-1-piperazino 4-acetoxyethyl-1-piperazino and the like.

The lower alkyl portion A of a tertiary amino-lower alkyl radical of the formula —A—Z may be represented by a lower alkylene radical, which contains preferably from two to three carbon atoms and separates the N,N-di-substituted amino group from the oxygen atom of the tertiary amino-lower alkoxy group of the formula —O—A—Z by this group A are primarily 1,2-ethylene, 1 - methyl - 1,2-ethylene, 2-methyl-1,2-ethylene or 1,3-propylene.

In addition to the substituent —O—A—Z the monocyclic carbocyclic aryl group $R_3$ may contain other substituents, such as, for example, lower alkyl, e.g. methyl, ethyl and the like, lower alkoxy, e.g. methoxy, ethoxy and the like, lower alkylenedioxy, e.g. methylenedioxy, lower alkyl-mercapto, e.g. methylmercapto, ethylmercapto and the like, nitro, amino, such as N,N-substituted amino, for example, N,N-di-lower alkyl-amino, e.g. N,N-dimethylamino and the like, halogeno, e.g. fluoro, chloro, bromo and the like, polyhalogeno-lower alkyl, e.g. trifluoromethyl, or additional groups of the formula —O—A—Z, having the previously-given meaning.

The radicals $R_4$, $R_5$ and $R_6$ represent primarily hydrogen. $R_4$ and $R_5$, when standing for lower alkyl, may be particularly methyl. $R_6$ may also stand for an acyl group. Such acyl group represents especially the acyl radical of a lower aliphatic carboxylic acid, such as a lower alkanoic acid, e.g. acetic, propionic, butyric, pivalic acid and the like. Acyl radicals may also be those of lower alkyl carbonic acids, e.g. ethyl carbonic acid and the like, lower alkenoic acids, e.g. acrylic, methacrylic acid and the like, or lower alkynoic acids, e.g. propiolic acid and the like; these lower aliphatic carboxylic acids may contain additional substituents, such as, for example, lower alkoxy, e.g. methoxy, ethoxy and the like, halogeno, e.g. fluoro, chloro, bromo and the like or N,N-di-lower alkyl-amino, e.g. N,N-dimethylamino, N,N-diethylamino and the like. Other acyl groups may be those of carbocyclic aryl carboxylic acids, such as monocyclic or bicyclic carbocyclic aryl carboxylic acids, e.g. benzoic or naphthoic acid, which may contain as additional substituents lower alkyl, e.g. methyl, ethyl and the like, lower alkoxy, e.g. methoxy, ethoxyl and the like, lower alkylenedioxy, e.g. methylenedioxy, lower alkyl-mercapto, e.g.

methylmercapto, ethylmercapto and the like, nitro, amino, such as N,N-disubstituted amino, for example, N,N-di-lower alkylamino, e.g. N,N-dimethylamino and the like, or halogeno, e.g. fluoro, chloro, bromo and the like. Furthermore, acyl radicals of heterocyclic aryl carboxylic acids, such as monocyclic heterocyclic aryl carboxylic acids, e.g. nicothinic, isonicotinic, furoic or thienoic acid, may also be represented by $R_6$.

Salts of the compounds of this invention are particularly therapeutically acceptable acid addition salts with inorganic acids, particularly mineral acids, such as hydrohalic acids, e.g. hydrochloric, hydrobromic, sulfuric, phosphoric acids and the like, with organic carboxylic acids, e.g. acetic, propionic, glycolic, lactic, pyruvic, succinic, maleic, hydroxymaleic, dihydroxylmaleic, fumaric malic, tartaric, citric, benzoic, cinnamic, mandelic, salicylic acid and the like, or organic sulfonic acids, e.g. methane sulfonic, ethane sulfonic, hydroxyethane sulfonic, p-toluene sulfonic acid and the like. Mono- or poly-salts may be formed, depending on the procedure used for the preparation of the salts and the number of salt forming groups present in the molecule.

Quaternary ammonium derivatives of the compounds of this invention are particularly those with reactive esters formed by aliphatic hydroxy-compounds with strong inorganic or organic acids.

Such esters are especially lower alkyl halides, e.g. methyl, ethyl, propyl or isopropyl chloride, bromide or iodide and the like, lower alkyl lower alkane sulfonates, e.g. methyl or ethyl methane or ethane sulfonate and the like, lower alkyl hydroxyl-lower alkane sulfonates, e.g. methyl 2-hydroxyethane sulfonate and the like, di-lower alkyl-sulfates, e.g. dimethyl sulfate, diethyl sulfate and the like. Also included as quaternary ammonium compounds are the quaternary ammonium hydroxides, and the salts of such quaternary ammonium hydroxides with inorganic, or particularly with organic carboxylic or sulfonic acids, such as with those described hereinbefore as being suitable for the preparation of acid addition salts. Mono- or poly-quaternary ammonium compounds may be formed, depending on the reaction conditions used and the number of tertiary amino groups present in the molecule.

The compounds of the present invention may also form N-oxide derivatives.

Due to the presence of an asymmetric carbon atom, the compounds of the invention may be obtained in the form of a racemate, and compounds with more than one asymmetric carbon atom may form mixtures of racemates. The latter may be separated into the single racemates, which may be resolved into the antipodes as shown hereinbelow.

The compounds of the present invention exhibit anti-uterotropic or anti-estrogenic effects. They may, therefore, be used, for example, as anti-fertility agents to prevent the fertilization of the ovum, as well as in conditions caused by hyperestrogenism and related disorders, such as, for example, endometriosis, dysmenorrhea, menopausal dysfunction and the like. They may also beneficially influence so-called collagen diseases, such as gout, lupus erythematosus, Still's disease, osteoporosis or related conditions.

In addition, the compounds of this invention affect the relative distribution of cholesterol in the body and may, therefore, be used in the treatment of arteriosclerosis, atherosclerosis and similar conditions. The compounds of the present invention may also be used as intermediates for the preparation of other useful compounds.

Particularly useful are compounds of the formula:

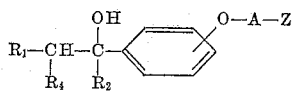

in which at least one of the radicals $R_1$ and $R_2$ represents pyridyl, and the other stands for pyridyl, phenyl, lower alkyl-phenyl, e.g. methyl-phenyl, ethyl-phenyl and the like, lower alkoxy-phenyl, e.g. methoxy-phenyl, ethoxy-phenyl and the like, halogeno-phenyl, e.g. fluoro-phenyl, chloro-phenyl, bromo-phenyl and the like, $R_4$ stands for hydrogen or methyl, A represents a lower alkylene radical, having from two to three carbon atoms and separating the N,N-disubstituted amino group Z from the oxygen atom by at least two carbon atoms, and Z stands for N,N-di-lower alkyl-amino, in which lower alkyl has from one to four carbon atoms, and therapeutically acceptable acid addition salts.

This series of compounds may be illustrated by the following groups of compounds having the formulae:

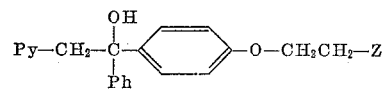

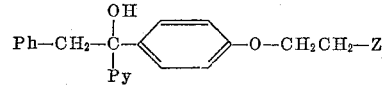

or

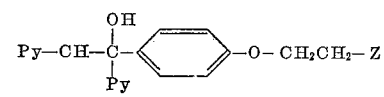

in which formulae Py represents pyridyl, Ph stands for phenyl, methyl-phenyl, methoxy-phenyl, chloro-phenyl or bromo-phenyl, and Z stands for N,N-di-lower alkyl-amino, in which lower alkyl contains from one to four carbon atoms, and therapeutically acceptable acid addition salts with mineral acids, lower alkane carboxylic acids, lower alkene discarboxylic acids, hydroxy-lower alkane dicarboxylic and tricarboxylic acids.

The compounds of this invention may be used as medicaments in the form of pharmaceutical preparations, which contain the new derivatives or salts thereof in admixture with a pharmaceutical organic or inorganic, solid or liquid carrier suitable for enteral, e.g. oral, or parenteral administration. For making up the preparations there may be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier for medicaments. The pharmaceutical preparations may be in the solid form, for example, as capsules, tablets or dragees, or in liquid form, for example, as solutions, suspensions or emulsions. If desired, they may contain auxiliary substances, such as preserving, stabilizing, wetting or emulsifying agents, salts for varying the osmotic pressure or buffers. They may also contain in combination, other therapeutically useful substances.

The compounds of this invention may be obtained, for example, by reacting a ketone of the formula:

in which $R_2$ and $R_3$ have the previously-given meaning, with an organo-metallic reagent of the formula:

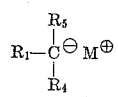

in which $R_1$, $R_4$ and $R_5$ have the previously-given meaning, with the proviso that whenever $R_2$ in the ketone represents a carbocyclic aryl radical, $R_1$ stands for a heterocyclic aryl radical, and $M^\oplus$ represents the positively charged ion of certain metals of the IA-group of the periodic system or the positively charged ion of the formula Met—Hal, in which Met represents certain divalent metals of the IIA-group and the IIB-group of the periodic system, and Hal stands for halogen, and, if desired, acylating in a resulting compound the tertiary hydroxyl group, and/or, converting a resulting salt into the free base, and/or, if desired, converting a free base into a salt or a quaternary ammonium compound thereof, and/or, separating a resulting mixture of racemates into single racemates, and/or, resolving a resulting racemate into the antipodes.

In the above-mentioned reagent of the formula:

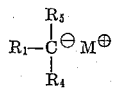

$M^{\oplus}$ represents primarily the positive ion of an alkali metal, such as sodium, or particularly lithium, or the positive ion of the formula $Mg-Hal^{\oplus}$, in which Hal represents a halogen, e.g. chlorine, bromine or iodine, atom. Alkali metal derivatives are preferably used with those compounds, in which $R_1$ represents a monocyclic heterocyclic aryl radical and each of the radicals $R_4$ and $R_5$ represents hydrogen or lower alkyl, or with compounds, in which $R_1$ stands for a monocyclic carbocyclic aryl radical, at least one of the radicals $R_4$ and $R_5$ represents lower alkyl, whereas the magnesium halide-type reagent (Grignard reagent) is useful with all other compounds, particularly those in which $R_1$ stands for a monocyclic carbocyclic aryl radical and both radicals $R_4$ and $R_5$ represent hydrogen, or those, in which $R_1$ represents a monocyclic heterocyclic aryl radical and $R_4$ and $R_5$ represent hydrogen.

Both types of reagents are used under similar conditions; preferably, the alkali metal compound or the Grignard reagent is prepared separately and is then reacted with the ketone. The diluent used during the preparation of the reagent, especially the Grignard reagent, for example, a di-lower alkyl ether, particularly diethylether, may be diluted or replaced by other solvents, for example, by other ethers, such as monocyclic carbocyclic aryl lower alkyl ethers, e.g. anisole and the like, bis-monocyclic carbocyclic aryl ethers, e.g. diphenyl ether and the like, cyclic ethers, e.g. tetrahydrofuran, p-dioxane and the like, organic bases, e.g. pyridine, N-methyl-morpholine and the like, monocyclic carbocyclic aryl hydrocarbons, e.g. benzene, toluene, xylene and the like, or aliphatic hydrocarbons, e.g. pentane, hexane and the like, or any other suitable inert solvent. The reaction may be carried out and completed under cooling, at room temperature, or at an elevated temperature; if necessary, the atmosphere of an inert gas, e.g. nitrogen, may be required, particularly when an alkali metal reagent is used.

The resulting reaction mixture may be worked up according to known methods. Thus, a complex resulting from the reaction of a ketone with a Grignard reagent may be broken, for example, by adding a weak acid, such as an aqueous solution of ammonium chloride and the like, to the reaction mixture. The desired product may be isolated by extraction, absorption and elution, distillation, crystallization and the like, and purified by recrystallization, salt formation and the like, depending on the physical appearance of the desired compound and/or its stability.

The starting materials used in the above reaction are known or, if new, may be prepared according to methods used for the preparation of known analogs.

For example, reagents of the formula

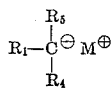

in which $R_4$ and $R_5$ have the previously-given meaning, $R_1$ represents a monocyclic heterocyclic aryl radical, and $M^{\oplus}$ represents the positive ion of an alkali metal, particularly a lithium ion, may be prepared by reacting the compound of the formula

in which $R_4$ and $R_5$ have the previously-given meaning and $R_1$ stands for a monocyclic heterocyclic aryl radical, with an organic alkali metal compound, such as, for example, phenyl sodium, phenyl lithium, n-butyl lithium and the like, preferably in the presence of an inert solvent, such as an ether, e.g. diethyl ether or tetrahydrofuran, or any other suitable inert solvent, and in the atmosphere of an inert gas, e.g. nitrogen.

Similarly, reagents of the formula

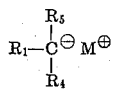

in which $R_1$ represents a monocyclic carbocyclic aryl radical, at least one of the radicals $R_4$ and $R_5$ stands for lower alkyl, and $M^{\oplus}$ the positive ion of an alkali metal, especially a lithium ion, may be obtained by treating with lithium and at temperatures below 0° C., a dilute solution of an ether of the formula

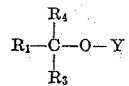

in which Y may stand for lower alkyl, e.g. methyl and the like, carbocyclic aryl, e.g. phenyl and the like, or a monocyclic carbocyclic aryl-lower alkyl radical, e.g. the radical of the formula

in which $R_1$, $R_4$ and $R_5$ have the above-given meaning and the like, in an inert solvent, especially an ether, e.g. tetrahydrofuran, and in the atmosphere of nitrogen.

However, for the introduction of a monocyclic carbocyclic aryl or a monocyclic carbocyclic aryl-lower alkyl radical, the use of a Grignard reagent, particularly a reagent of the formula

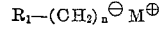

in which $R_1$ stands for a carbocyclic aryl radical, and $M^{\oplus}$ represents the positive ion of the formula Met—$Hal^{\oplus}$, in which Met and Hal have the previously-given meaning, particularly of the formula $Mg-Hal^{\oplus}$, in which Hal has the above-given meaning, may be more appropriate. This procedure may also be advantageous for reagents of the above formula, in which $R_1$ represents a monocyclic heterocyclic aryl radical. These Grignard reagents are known, of if new, may be prepared according to procedures used for the known ones.

Certain ketones used as intermediates in the procedure of the invention, particularly those of the formula:

in which $R_3$ has the previously-given meaning and $R_2$ represents a carbocyclic aryl radical, are known.

Ketones of the formula

in which $R_3$ has the previously-given meaning and $R_2$ represents a monocyclic heterocyclic aryl, particularly a pyridyl, radical, and acid addition salts thereof, particularly the ketones of the formula

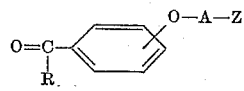

in which $R_2$ represents pyridyl, A represents an alkylene radical containing from two to three carbon atoms and separating the N,N-di-lower alkyl-amino group from the oxygen atom by from two to three carbon atoms, and acid addition salts thereof, are new and are intended to be included within the scope of the invention. This series of intermediates may be illustrated by the ketones of the formula:

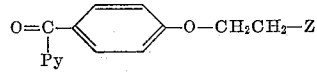

in which Py stands for a pyridyl radical and Z represents an N,N-di-lower alkyl-amino group, in which lower alkyl contains from one to four carbon atoms, and acid addition salts thereof.

The new ketones of the above formula may be prepared, for example, by reacting an acid halide of the formula $R_2$—CO—Hal, in which $R_2$ and Hal have the previously-given meaning, with a compound of the formula $R_3$—H, in which $R_3$ has the previously-given meaning, or with a compound of the formula $R_3'$—H, in which $R_3'$ stands for a radical, which in the resulting product is capable of being converted into the desired radical $R_3$, in the presence of a Friedel-Crafts catalyst, and converting in any resulting product containing a radical $R_3'$, such radical into the desired radical $R_3$, and/or, if desired, converting a resulting salt into a free compound, and/or, if desired, converting a free base into a salt thereof.

The reaction may be carried out according to the procedure known as the Friedel-Crafts reaction. Acid chlorides are particularly suitable starting materials, and strong Lewis acids, particularly aluminum chloride, aluminum bromide, stannic chloride, boron trifluoride etherate and the like, may be used as catalysts; inert solvents, such as carbon disulfide, nitrobenzene and the like, may serve as diluents.

In view of the fact that under the acidic conditions of the reaction etherified hydroxyl groups may be liberated, resulting compounds with free hydroxyl groups may be reetherified, for example, according to methods shown hereinbelow.

The ketones used as the starting materials, particularly those of the formula

in which $R_2$ represents a pyridyl radical, A stands for a lower alkylene radical containing from two to three carbon atoms and separating the group Z from the oxygen by at least two carbon atoms, and Z represents one of the previously-mentioned N,N-di-substituted amino groups, and salts thereof, may also be prepared by treating an ester of the formula

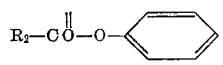

in which $R_2$ represents a pyridyl radical, with a strong inorganic Lewis acid, and reacting the resulting phenolic ketone of the formula:

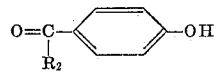

in which $R_2$ has the previously-given meaning, said phenolic ketone being preferably in the form of an alkali metal salt thereof, with a halide of the formula:

Hal—A—Z in which A and Z have the previously-given meaning and Hal represents a halogen atom, particularly chlorine, and, if desired, carrying out the optional steps.

The rearrangement of the carboxylic acid ester to the phenolic ketone in the presence of a strong inorganic Lewis acid may be carried out according to the procedure known as the Fries Rearrangement (A. H. Blatt, Organic Reactions, vol. I, p. 342, 1942, Wiley, New York). The strong inorganic Lewis acid is primarily a halide of a polyvalent metal, particularly aluminum chloride, aluminum bromide, stannic chloride and the like; suitable solvents, if necessary, are, for example, carbon disulfide, nitrobenzene, or analogous inert solvents.

The conversion of the phenolic ketone into the starting material is preferably carried out by forming the alkali metal salt of the phenolic ketone, for example, by treatment with an alkali metal hydride, e.g. sodium hydride and the like, or an alkali metal amide, e.g. sodium amide and the like, in a solvent, such as, for example, p-dioxane or an analogous inert solvent suitable for the preparation of such metal derivatives. The resulting salt is then reacted with the halide of the formula Hal—A—Z in which A, Z and Hal have the above-given meaning, in an inert solvent, such as, for example, in the diluent used for the preparation of the salt.

A modification of the procedure for the preparation of compounds of this invention, particularly those of the formula

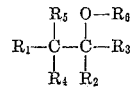

in which $R_1$ represents a heterocyclic aryl radical and $R_2$ stands for a carbocyclic aryl radical and $R_3$, $R_4$, $R_5$ and $R_6$ have the previously-outlined meaning, comprises reacting a ketone of the formula

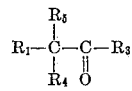

in which $R_1$ has the above-given meaning, but represents primarily a heterocyclic aryl radical and $R_3$, $R_4$ and $R_5$ have the above-given meaning, with a reagent of the formula:

$$R_2^{\ominus} M^{\oplus}$$

in which $R_2$ may have the previously-given meaning, but represents primarily a carbocyclic aryl radical, with the proviso that whenever $R_2$ stands for a carbocyclic aryl radical, $R_1$ represents a heterocyclic aryl radical, and $M^{\oplus}$ stands for the positive ion of certain alkali metals (group IA of the periodic system), or more particularly, the positive ion of the formula Met—Hal$^{\oplus}$, in which Met and Hal have the previously-given meaning, particularly the ion of the formula Mg—Hal$^{\oplus}$, and, if desired, carrying out the optional steps.

The reaction is carried out as shown hereinbefore, for example, according to the conditions of the Grignard reaction.

Although certain heterocyclic compounds form alkali metal or Grignard reagents, such as, for example, 2-pyridyl magnesium chloride or 3-pyridyl magnesium bromide, monocyclic carbocyclic aryl metal reagents are advantageously used in the above modification of the general procedure. They can be prepared according to known methods, such as those previously described.

The ketones used as intermediates in the above modification are known, or, if new, may be prepared according to known procedures. For example, ketones of the formula

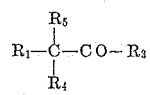

in which $R_1$, $R_3$, $R_4$ and $R_5$ have the previously-given meaning, may be prepared by reacting a reagent of the formula

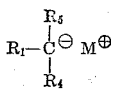

in which $R_1$, $R_4$ and $R_5$ have the above-given meaning and $M^\oplus$ represents the positive ion of an alkali metal, e.g. sodium, or particularly lithium, with an ester of the ester of the acid of the formula

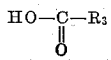

in which $R_3$ has the previously-given meaning, with a lower alkanol, e.g. methanol, ethanol and the like. The preparation is carried out under known conditions, which are in general analogous to those employed in reactions involving organic metal reagents, as, for example, described hereinbefore.

A third modification of the procedure for manufacturing the compounds of this invention comprises reacting a ketone of the formula

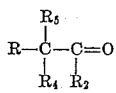

in which $R_1$, $R_2$, $R_4$ and $R_5$ have the previously-given meaning, with a reagent of the formula

in which $R_3$ and $M^\oplus$ have the previously-given meaning and, if desired, carrying out the optional steps.

In the above reaction the reagent $R_3^\ominus M^\oplus$ represents particularly a Grignard reagent, in which $M \oplus$ stands primarily for the positive ion of the formula $Mg\text{---}Hal^\oplus$, in which Hal represents, for example, chlorine or bromine and the like. Such Grignard reagents may be prepared according to known methods, such as the "Method of Entrainment," described by Kharash and Reinmuth, Grignard Reactions of Nonmetallic Substances (Prentice-Hall, 1954), or by using a cyclic reactor as disclosed by Lawesson, Act. Chem. Scand., vol. 12, p. 1 (1958). The ketones are known, or, if new, may be prepared according to methods used for the known types.

If desired, the tertiary alcohol groups in the products resulting from the above-described procedure may be converted into the corresponding acyloxy groups. For example, the reactive functional derivative of a carboxylic acid and the tertiary alcohol are contacted in the presence of an organic base, for example, a tertiary amine, such as an N,N,N-tri-lower alkyl-amine, e.g. N,N,N-trimethyl-amine, N,N-dimethyl-N-ethyl-amine, N,N-diethyl-N-methyl-amine, N,N,N-triethyl-amine and the like, or N-benzyl-N,N-dimethyl-amine, N,N-dimethyl-aniline and the like, or a heterocyclic base, e.g. pyridine, collidine, lutidine and the like. The liquid bases may also serve as solvents, or other diluents may be added, such as, for example, carbocyclic aryl hydrocarbons, e.g. benzene, toluene and the like, aliphatic hydrocarbons, e.g. pentane, hexane and the like, or ethers, e.g. diethyl ether and the like. Reactive functional derivatives of carboxylic acids are primarily acid anhydrides, e.g. acetic, propionic acid anhydride and the like, or acid halides, particularly chlorides, which reagents may be used in the absence or in the presence of a diluent, such as a tertiary amine, or particularly a heterocyclic base, e.g. pyridine.

The esterification may also be accomplished by treating the alcohol with the anhydride of a carboxylic acid in the presence of an acid instead of the base; for example, sulfuric acid or perchloric acid may be utilized as acylating reagent particularly when used in catalytic amounts.

Additional esterification reagents are, for example, ketenes, e.g. ketene itself or substituted ketenes, which reagents furnish acetyl or substituted acetyl radicals. Such reaction is performed in an inert solvent, such as an aromatic hydrocarbon, e.g. toluene and the like.

The compounds of this invention may be obtained in the form of free bases or as the salts thereof. A salt may be converted into the free base, for example, by reaction with an alkaline reagent, such as, for example, aqueous alkali metal hydroxide, e.g. lithium, sodium or potassium hydroxide, aqueous alkali metal carbonate, e.g. sodium or potassium carbonate or hydrogen carbonate, or aqueous ammonia, or any other suitable alkaline reagent, as well as an anion exchanger. A free base may be converted into its acid addition salts by reacting the former with one of the inorganic or organic acids mentioned hereinbefore; for example, a solution of the free base in a solvent, such as a lower alkanol, e.g. methanol, ethanol, propanol, isopropanol and the like, or an ether, e.g. diethylether and the like, or any other suitable solvent, or solvent mixture, is treated with the acid or a solution thereof and the desired salt is recovered. The salts may also be obtained as the hemihydrates, monohydrates, sesquihydrates of polyhydrates depending on the conditions of salt formation; mono- or poly-salts may be formed depending on the number of salt-forming groups.

The quaternary ammonium derivatives of the compounds of this invention may be obtained, for example, by reacting the tertiary base with a lower alkyl halide, e.g. methyl, ethyl, propyl or isopropyl chloride, bromide, iodide and the like, a lower alkyl lower alkane sulfonate, e.g. methyl or ethyl methane or ethane sulfonate and the like, a lower alkyl lower hydroxyalkane sulfonate, e.g. methyl 2-hydroxyethane sulfonate and the like, or a dilower alkyl sulfate, e.g. dimethyl sulfate, diethyl sulfate and the like. The quaternizing reactions may be performed in the presence of a solvent; suitable solvents are more especially lower alkanols, e.g. methanol, ethanol, propanol, isopropanol, butanol, pentanol and the like, lower alkanones, e.g. acetone, ethyl methyl ketone and the like, or organic acid amides, e.g. formamide, dimethyl-formamide and the like. If necessary, elevated temperature, pressure and/or the atmosphere of an inert gas, e.g. nitrogen, may be required.

Resulting quaternary ammonium compounds may be converted into the corresponding quaternary ammonium hydroxides, for example, by reacting a quaternary ammonium halide with silver oxide, or a quaternary ammonium sulfate with barium hydroxide, by treating a quaternary ammonium salt with an anion exchanger, or by electrodialysis. From a resulting quaternary ammonium hydroxide there may be prepared therapeutically acceptable quaternary ammonium salts by reacting the former with acids, for example, with those outlined hereinbefore for the preparation of the acid addition salts. Quaternary ammonium compounds may also crystallize as hydrates; mono- or poly-quaternary ammonium compounds may be formed depending on the number of tertiary amino groups present.

N-oxides of the compounds of the present invention may be obtained, for example, by treatment with an N-oxidizing reagent, such as an inorganic per-acid, e.g. persulfuric acid and the like, an organic per-acid, particularly a per-carboxylic acid, e.g. peracetic acid, perbenzoic acid, monoperphthalic acid and the like, as well as organic per-sulfonic acids, e.g. p-toluene persulfonic acid and the like, or hydrogen peroxide or ozone and the like. Diluents used in such reaction are, for example, halogenated lower aliphatic hydrocarbons, e.g. methylene chloride, chloroform, ethylene chloride and the like, monocyclic carbocyclic hydrocarbons, e.g. benzene, toluene and the like, or any other suitable inert solvent.

Compounds of the present invention which contain more than one asymmetric atom, may be obtained in the form of mixtures of racemates. Such mixtures may be separated into individual racemic compounds, salts, quaternary ammonium compounds or N-oxides thereof, using known methods, which may be, for example, based on physico-chemical differences, such as solubility, adsorbability and the like. Thus, mixtures of racemates may be separated by fractionate crystallization, if necessary, by using a derivative, e.g. a salt, a quaternary ammonium compound and the like, for a mixture of racemates, by fractionated distillation and the like.

Separated racemates or racemates of compounds, which contain one asymmetric carbon atom only, may be resolved into the optically active forms, the levo-rotatory l-form and the dextro-rotatory d-form. Resolution procedures may be carried out according to known methods suitable for the separation of racemates. For example, to a solution of the free base of a racemate (a d,l-compound) in a solvent, such as a lower alkanol, e.g. methanol, ethanol, isopropanol and the like, a lower alkanone, e.g. acetone, ethyl methyl ketone and the like, or any other suitable solvent or solvent mixture, is added one of the optically active forms of an acid containing an asymmetric carbon atom, or a solution thereof, for example, in the same lower alkanol, lower alkanone, other solvent or solvent mixture mentioned hereinabove. Salts, which are formed by the optically active forms of the base with the optically active form of the acid may then be isolated, primarily on the basis of their different solubilities. Especially useful as optically active forms of salt-forming acids having an asymmetric carbon atom are the d-tartaric acid (L-tartaric acid) and the l-tartaric acid (D-tartaric acid); the optically active forms of dibenzoyl tartaric, di-p-toluyl-tartaric, malic, mandelic, 10-camphor sulfonic acid, quinic acid and the like, may also be used. The free and optically active base may be obtained from a resulting salt according to methods used for the conversion of a salt into a base, for example, as is outlined hereinbefore. An optically active base may be converted into a therapeutically useful acid addition salt with one of the acids mentioned hereinbefore, or may be converted into a quaternary ammonium compound as described hereinabove. The optically active forms may also be isolated by biochemical methods.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

This is a continuation-in-part of my application Serial No. 808,026, filed April 22, 1959.

The following examples are intended to illustrate the invention and are not to be construed as being limitations thereon. Temperatures are given in degrees centigrade.

*Example 1*

11.2 g. of a solution of n-butyl lithium in hexane, containing 1.768 g. of butyl lithium (0.158 g. of butyl lithium cooled in an ice-bath. 2.57 g. of α-picoline in 20 ml. of benzene is added; the red solution is stirred for three hours at room temperature.

A solution of 4.52 g. of 4-(2-N,N-diethylaminoethoxy)-4'-methoxy-benzophenone in 25 ml. of benzene is slowly given to the picoline lithium reagent; the mixture is stirred for three hours at room temperature and then allowed to stand overnight. The dark green solution is poured onto ice, the organic layer is separated and the aqueous phase is extracted three times with ether. The organic solutions are combined, washed with concentrated aqueous sodium chloride and dried over sodium sulfate. The solvents are removed to yield an orange oil. 1 g. of said oil, dissolved in a 1:1-mixture of hexane and benzene, is chromatographed on an absorption column containing neutral aluminum oxide (activity III according to Brockmann) prewashed with hexane. A small amount of α-picoline is removed with the 1:1-mixture of hexane and benzene; the 1-[4-(2-N,N-diethylaminoethoxy)-phenyl]-1-(4-methoxy-phenyl) - 2 - (2 - pyridyl)-ethanol is eluted as a yellow oil with a 1:1-mixture of benzene and ether and analyzes correctly:

Theory: C, 74.25; H, 7.67; N, 6.66. Found: C, 74.32; H, 7.92; N, 6.38.

The IR-absorption spectrum reveals the absence of a carbonyl band at 1680 cm.$^{-1}$, and the presence of the 2-pyridyl band at 765 cm.$^{-1}$. The hydrochloric acid and hydrobromic acid addition salts, prepared by treating a solution of 1-[4-(2-N,N-diethylaminoethoxy)-phenyl]-1-(4-methoxy-phenyl)-2-(2-pyridyl)-ethanol in an inert solvent, such as diethyl ether, benzene and the like, with gaseous hydrogen chloride or hydrogen bromide and the like, and recrystallizing from a mixture of diethyl ether and acetone, are hydroscopic.

By substituting γ-picoline or 2-ethyl-pyridine for the α-picoline and proceeding as outlined in the above procedure the 1-[4-(2-N,N-diethylaminoethoxy)-phenyl]-1-(4-methoxy-phenyl)-2-(4-pyridyl)-ethanol and the 1-[4-(2-N,N-diethylaminoethoxy)-phenyl]-1-(4-methoxy-phenyl)-2-(2-pyridyl)-propanol, respectively, can be prepared.

The starting material may be prepared as follows: A solution of 38 g. of aluminum chloride in 85 ml. of nitrobenzene may be obtained by heating a mixture thereof to 100°, which is then cooled to 0°. 32.5 g. of phenyl 4-methoxy-benzoate is added at once and the reaction mixture is stirred for one hour at 80°. The nitrobenzene is removed by steam distillation, the residue is diluted with a 1:1-mixture of concentrated aqueous hydrochloric acid and water, and the acidic phase is extracted three times with ethyl acetate. The organic extract is washed with concentrated aqueous sodium chloride, treated with activated charcoal and dried over sodium sulfate. The solvent is removed under reduced pressure, a 1:1-mixture of ether and pentane is added, and the crystalline material is filtered off. An additional crop is obtained from the mother liquors; the combined crops are recrystallized twice from aqueous ethanol to yield the 4-hydroxy-4'-methoxy-benzophenone, M.P. 153–154°; yield: 6.8 g.

To a solution of 6.8 g. of 4-hydroxy-4'-methoxy-benzophenone in 90 ml. of toluene is added portionwise 1.42 g. of sodium hydride (52 percent pure) while stirring at room temperature. 28.8 ml. of a toluene solution of 2-N,N-dimethylaminoethyl chloride, containing 4.03 g. of the base (0.14 g. of the base in 1 ml. of toluene), is added; the reaction mixture is refluxed for three hours, then allowed to stand overnight. The solid material is removed by filtration, is washed with toluene and then discarded. The solvent is removed from the filtrate, ether is added and dry hydrogen chloride gas is passed through the solution. The oily precipitate is filtered off, crystalized from a 1:1-mixture of acetone and ether and recrystallized from ethyl acetate to yield the 4-(2-N,N-diethylaminoethoxy) - 4'-methoxy - benzophenone hydrochloride, M.P. 139–140°, yield: 5.2 g.

The hydrochloride salt is dissolved in a minimum amount of water, 2 N aqueous sodium carbonate is added until the solution reacts neutral, and the organic material is then extracted with ether. The organic layer is washed with aqueous sodium chloride and dried over sodium sulfate, the solvent is evaporated and the 4-(2-N,N-diethylaminoethoxy) - 4'-methoxy - benzophenone is distilled under reduced pressure. It solidifies and melts at 56–60°; yield: 4.52 g.

*Example 2*

A solution of 8.15 g. of α-picoline in 63.5 ml. of benzene is slowly added to a hexane solution of 5.6 g. of n-butyl lithium (35.6 ml. of a hexane solution containing 0.158 g. of n-butyl lithium per ml.) while stirring and cooling and under an atmosphere of nitrogen. The reaction mixture is stirred at room temperature for 2½ hours; it is then cooled and a solution of 13.0 g. of 4-(2-N,N-diethylaminoethoxy)-benzophenone in 78 ml. of benzene is slowly added. Stirring is continued for three hours and the mixture is then poured onto ice. The resulting layers are separated, the aqueous phase is extracted three times with diethyl ether, and the extracts are combined with the original benzene solution; the combined organic solutions are washed with water and a saturated aqueous solution of sodium chloride and then dried over sodium sulfate. The solvents are removed under reduced pressure, the excess of α-picoline is distilled off and the remaining oil is taken up in ethanol. Upon adding water, an oily precipitate is formed, which is filtered off, dissolved in benzene and chromatographed on aluminum oxide (neutral, activity III), prewashed with hexane. The following eluates are collected in 50 ml. portions: 400 ml. of benzene (fractions 1 to 8), 250 ml. of a 7:3-mixture of benzene and hexane (fractions 9 to 13), 400 ml. of a 1:1-mixture of benzene and hexane (fractions 14 to 21), 450 ml. of benzene (fractions 22 to 30) and 50 ml. of ethyl acetate (fraction 31). Fractions 5 to 30 (yielding crystalline material, are combined, the residue is recrystallized from a mixture of ethanol and water to yield 1-[4-(2-N,N-diethylaminoethoxy)-phenyl]-1-phenyl-2-(2-pyridyl) - ethanol, M.P. 63–65°; yield: 2.18 g.

4-(2-N,N-diethylaminoethoxy)-benzophenone may be replaced by 4-(3-N,N-diethylaminopropyloxy) - benzophenone or 4-[2-(1-piperidino)-ethyl] - benzophenone; upon treatment with the lithium derivative of α-picoline according to the previously-given procedure, these starting materials yield the 1-[4-(3-N,N-diethylaminoethoxy)-phenyl]-1-phenyl-2-(2-pyridyl)-ethanol and the 1-{4-[2-(1-piperidino)-ethyl]-phenyl} - 1 - phenyl-2-(2-pyridyl)-ethanol, respectively.

*Example 3*

The Grignard reagent of 4.20 g. of 4-methoxy-benzyl chloride in 42 ml. of ether is prepared in a cyclic Grignard reactor as, for example, described by Lawesson, Act. Chem. Scand., vol. 12, p. 1 (1958), using amalgamataed magnesium and initiating the reaction with a few drops of allyl bromide. The resulting diethyl ether solution of 4-methoxy-benzyl magnesium chloride is added to 8.0 g. of 4-(2-N,N-diethylaminoethoxy)-phenyl 3-pyridyl ketone in 100 ml. of diethyl ether; the reaction mixture is refluxed for one hour and then decomposed with saturated aqueous ammonium chloride. The resulting layers are separated, the aqueous portion is extracted three times with chloroform, and the combined organic solutions are washed with saturated aqueous ammonium chloride and dried over sodium sulfate. The solvents are evaporated, the residue is taken up in a mixture of ethanol containing a small amount of water, the solution is filtered and the filtrate is evaporated to dryness. A solution of the red, oily residue in benzene is chromatographed on 150 g. of aluminum oxide (neutral, activity III), prewashed with hexane. The fractions obtained with benzene, a 4:1-mixture of benzene and ether, a 1:1-mixture of benzene and ether are combined, the solvents are evaporated and the residue is triturated with ether. The resulting 1-[4-(2-N,N-diethylaminoethoxy) - phenyl]-2-(4-methoxy-phenyl)-1-(3-pyridyl)-ethanol (yield: 2.54 g.) is recrystallized twice from a mixture of ethanol and water, M.P. 124–126° C.

The starting material may be prepared as follows: 750 ml. of thionyl chloride is slowly added to 200 g. of nicotinic acid while stirring and cooling on an ice bath. The mixture is refluxed for one hour and the excess of thionyl chloride is distilled off to leave the nicotinic acid chloride. 300 ml. of anisole is added and distilled off to remove all traces of thionyl chloride. A fresh amount of 750 ml. of anisole is given to the acid chloride, the mixture is cooled, and diluted with 600 ml. of carbon disulfide; a total of 495 g. of aluminum chloride is slowly given to the solution, and after the vigorous reaction has subsided, the reaction mixture is heated to reflux temperature and maintained at that temperature for one hour. After standing overnight at room temperature, the solvent is evaporated and the residue is decomposed on a mixture of ice and concentrated aqueous hydrochloric acid. The aqueous mixture is extracted three times with diethyl ether, the aqueous layer is brought to pH about 12 by adding aqueous sodium hydroxide and the resulting solid material is filtered off, dried and then suspended in hot ethanol and chloroform. The solid residue is repeatedly treated with the above solvent mixture, the filtrates are combined and evaporated to dryness. Water is added to the residue, the aqueous mixture is extracted with chloroform, and the organic extracts are washed with a saturated aqueous sodium chloride solution and dried over sodium sulfate. The solvent is removed, the residue is chilled, whereupon partial crystallization occurs. The crystalline material is filtered off to yield the 4-methoxy-phenyl 3-pyridyl ketone, M.P. 80–93.5° (yield: 139.3 g.), which can be further purified by recrystallization from ethanol and water.

A mixture of 102.5 g. of 4-methoxy-phenyl 3-pyridyl ketone and 195 g. of 48 percent aqueous hydrobromic acid is refluxed for five hours and then poured into water. The oily mixture is adjusted to pH about 3 with 2 N aqueous sodium hydroxide, the crystalline material is filtered off and recrystallized from ethanol (95 percent). The solid material is treated with 2 N aqueous sodium hydroxide until a basic reaction is obtained and approximately 2000 ml. of water is added. The aqueous solution is thoroughly extracted with chloroform, then adjusted to pH about 5 and the crystalline 4-hydroxy-phenyl 3-pyridyl ketone is filtered off which is purified by repeated recrystallizations from a mixture of ethanol and water, M.P. 196.5–198°; yield: 37.8 g.

To a cold solution of 14.1 g. of 4-hydroxy-phenyl 3-pyridyl ketone in 200 ml. of toluene and 100 ml. of N,N-dimethylformamide is added portionwise while stirring 3.4 g. of sodium hydride (of 50 percent strength). The temperature is then allowed to rise to room temperature, 9.6 g. of 2-N,N-diethylaminoethyl chloride in toluene (68.5 ml. of a toluene solution containing 0.140 g. of the reagent per ml.) is added and the mixture is stirred at room temperature for one hour, then refluxed for three hours and allowed to stand at room temperature overnight. Water is added to the residue obtained after filtration and evaporation of the solvent, the organic material is extracted with diethyl ether, the extract is dried over sodium sulfate and the yellow oil is distilled; the 4-(2-N,N-diethylaminoethoxy)-phenyl 3-pyridyl ketone is collected at 166°/0.01 mm.; yield: 17.5 g.

By replacing the nicotinic acid in the above procedure by isonicotinic acid, the desired 4-(2-N,N-diethylaminoethyl)-phenyl 4-pyridyl ketone can be prepared as shown hereinabove, and then reacted with the Grignard reagent obtained from 4-methoxy-benzyl chloride to yield the desired 1-[4-(2-N,N-diethylaminoethoxy) - phenyl]-2-(4-methoxy-phenyl)-1-(4-pyridyl)-ketone.

*Example 4*

The Grignard reagent obtained from 0.44 g. of magnesium in 20 ml. of diethyl ether and 2.98 g. of 4-chlorobenzyl chloride in 20 ml. of diethyl ether is refluxed for two hours and then cooled. A solution of 5.0 g. of 4-(2-N,N-diethylaminoethoxy)-phenyl 3-pyridyl ketone in 20 ml. of diethyl ether is added; a yellow solid precipitates and the reaction mixture is refluxed for 2½ hours. After cooling, the Grignard product is decomposed by adding saturated aqueous ammonium chloride. The two resulting layers are separated, the aqueous layer is washed with ether and chloroform, and all organic fractions are combined, washed with a saturated aqueous sodium chloride solution and dried over sodium sulfate. The solvents are evaporated, 9.0 g. of a thick orange oil is recovered, a benzene solution of which is chromatographed on aluminum oxide (neutral) containing 5 percent water, prewashed with hexane. The fractions with a 4:1-mixture of benzene and diethyl ether, a 1:1-mixture of benzene and diethyl ether, and diethyl ether are allowed to stand in the cold. The crystalline materials are collected and recrystallized from a mixture of ethanol and water. 2.4 g. of 2-(4-chlorophenyl)-1-[4-(2-N,N-diethylaminoethoxy)-phenyl]-1-(3-pyridyl)-ethanol is recovered, M.P. 123–125°.

The 4-chloro-benzyl chloride in the above procedure may be replaced, for example, by 3-chloro-benzyl chloride, 3,4-dichloro-benzyl chloride and the like; the magnesium Grignard reagents of such halide compounds, when reacted with the 4-(2-N,N-diethylaminoethoxy)-phenyl 3-pyridyl ketone according to the above-shown procedure, yield the desired 2-(3-chloro-phenyl)-1-[4-(2-N,N-diethylaminoethoxy)-phenyl]-1-(3-pyridyl)-ethanol, 2-(3,4-dichloro-phenyl)-1-[4 - (2 - N,N - diethylaminoethoxy)-phenyl]-1-(3-pyridyl)-ethanol and the like.

*Example 5*

A solution of 4.08 g. of α-picoline in 32 ml. of benzene is added slowly to a hexane solution containing 2.3 g. of n-butyl lithium (13.4 ml. of a hexane solution containing 0.172 g. of n-butyl lithium per ml.) while cooling in an ice-bath, stirring and flushing with dry nitrogen. After completing the addition, the reaction mixture is stirred for two hours at room temperature and a solution of 6.55 g. of 4-(2-N,N-diethylaminoethoxy)-phenyl 3-pyridyl ketone in 39 ml. of benzene is added slowly. Stirring is continued for three hours, the reaction mixture is allowed to stand overnight at room temperature and is then poured into ice. The organic layer is separated, the aqueous phase is extracted with ether and chloroform, the extraction solutions are combined with the original organic layer and the combined solutions are washed with a saturated aqueous sodium chloride solution and dried over sodium sulfate. An orange oil is obtained after removal of the solvents, which is chromatographed on aluminum oxide (neutral, containing 5 percent water) prewashed with hexane. The crystalline materials obtained from the 4:1-mixture of benzene and diethyl ether, 1:1-mixture of benzene and diethyl ether, and diethyl ether eluates are combined and recrystallized three times from a mixture of diethyl ether and pentane to yield 2.2 g. of 2-(2-pyridyl)-1-(3-pyridyl)-1-[4-(2-N,N - diethylaminoethoxy) - phenyl]-ethanol, M.P. 70–71°.

α-Picoline in the above reaction may be replaced by γ-picoline or 2-ethyl-pyridine; the lithium derivative of these pyridine compounds, when reacted with the 4-(2-N,N-diethylaminoethoxy)-phenyl 3-pyridyl ketone according to the previously-given procedure, yield the 1-(3-pyridyl)-2-(4-pyridyl)-1-[4-(2 - N,N - diethylaminoethoxy)-phenyl]-ethanol and the 2-(2-pyridyl)-1-(3-pyridyl)-1-[4-(2-N,N-diethylaminoethoxy)-phenyl] - propanol, respectively.

*Example 6*

A solution of 4-chloro-benzyl magnesium chloride in diethyl ether may be treated with 4-(2-N,N-dimethylaminoethoxy)-phenyl 3-pyridyl ketone according to the procedure shown in Example 4; the resulting 2-(4-chlorophenyl)-1-[4-(2-N,N-dimethylaminoethoxy) - phenyl]-1-(3-pyridyl)-ethanol may be converted to the maleate by treatment of an ethanol solution of the free base with maleic acid.

The starting material may be obtained according to the method outlined in Example 3, i.e. the resulting 4-hydroxy-phenyl 3-pyridyl ketone is etherified to the desired 4-(2-N,N-dimethylaminoethoxy)-phenyl 3-pyridyl ketone by reacting the sodium salt with 2-N,N-dimethylaminoethyl chloride.

By utilizing the procedure outlined in Example 1 and choosing the appropriate starting materials, the following compounds may be prepared:

1-(4-methyl-phenyl)-1-{4-[2-(1 - pyrrolidino) - ethoxy]-phenyl}-2-(2-pyridyl)-ethanol,
1-phenyl-1-[4-(2-N,N-dimethylamino-2-methyl - ethoxy)-phenyl]-2-(2-pyridyl)-ethanol,
1-[4-(2-N,N-diethylaminoethoxy)-phenyl]-1-(4 - dimethylaminophenyl)-2-(4-pyridyl)-ethanol.

*Example 7*

A mixture of 1-[4-(2-N,N-diethylaminoethoxy)-phenyl]-1-(4-methoxy-phenyl)-2-(2 - pyridyl) - ethanol, propionic acid anhydride and pyridine yields upon standing at 5° the desired 1-propionyloxy-1-[4-(2-N,N-diethylaminoethoxy)-phenyl]-1-(4 - methoxy-phenyl) - 2 - (2-pyridyl)-ethane.

*Example 8*

The 1-[4-(2-N,N-diethylaminoethoxy)-phenyl]-1 - (4-methoxy-phenyl)-2-(2-pyridyl)-ethanol of Example 1 may also be obtained by treating the 4-(2-N,N-diethylaminoethoxy)-phenyl 2-pyridylmethyl ketone with 4-methoxyphenyl magnesium chloride, by using a cyclic Grignard reactor, decomposing the complex by adding aqueous ammonium chloride and isolating the desired 1-[4-(2-N,N-diethylaminoethoxy)-phenyl]-1-(4-methoxy - phenyl)-2-(2-pyridyl)-ethanol.

The 4-(2-N,N-diethylaminoethoxy)-phenyl 2-pyridylmethyl ketone, used as the starting material in the above reaction may be obtained by reacting a solution of α-picoline lithium in hexane with methyl 4-(2-N,N-diethylaminoethoxy)-benzoate.

*Example 9*

A solution of 1.0 g. of 1-[4-(2-N,N-diethylaminoethoxy)-phenyl]-2-(4-methoxy-phenyl) - 1 - (3-pyridyl)-ethanol in chloroform is treated with an equivalent amount of perbenzoic acid; the N-oxide of 1-[4-(2-N,N-diethylaminoethoxy)-phenyl] - 2 - (4-methoxyphenyl)-1-(3-pyridyl)-ethanol may be recovered from the reaction mixture according to standard procedures.

*Example 10*

The methiodide of 2-(4-methoxy-phenyl)-1-[4-(2-N,N-diethylaminoethoxy)-phenyl]-1-(3-pyridyl)-ethanol may be obtained by treating the free base in ethanol with an equivalent amount of methyl iodide.

Any functional groups attached to portions of a resulting compound may be converted into other functional groups: for example, a nitro group may be reduced to an amino group, a nitro or a primary amino group may be reductively alkylated to form secondary or tertiary amino groups, and an amino group may be diazotized and converted to halogen according to the Sandmeyer method, etc.

What is claimed is:
1. A member of the group consisting of compounds of the formula

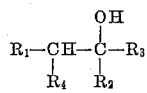

in which each of the radicals $R_1$ and $R_2$ is a member selected from the group consisting of pyridyl, phenyl, lower alkyl-phenyl, lower alkoxy-phenyl and halogenophenyl, with the proviso that at least one of the radicals $R_1$ and $R_2$ stands for pyridyl, $R_3$ is the group of the formula

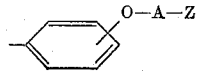

in which A is lower alkylene having from two to three carbon atoms and separates the group Z from the oxygen atom by from two to three carbon atoms and Z stands for N,N-di-lower alkyl-amino, and $R_4$ is a member selected from the group consisting of hydrogen and methyl, therapeutically acceptable acid addition salts N-oxides and lower alkyl quaternary ammonium salts thereof.

2. A compound of the formula

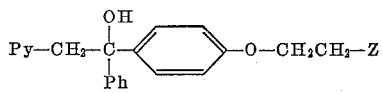

in which Py is pyridyl, Ph stands for phenyl, and Z stands for N,N-di-lower alkylamino.

3. 1 - [4 - (2 - N,N-diethylaminoethoxy)-phenyl]-1-(4-methoxy-phenyl)-2-(2-pyridyl)-ethanol.

4. 1 - [4 - (2 - N,N - diethylaminoethoxy) - phenyl]-1-phenyl-2-(2-pyridyl)-ethanol.

5. A compound of the formula

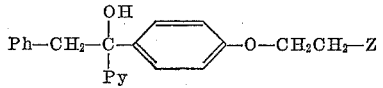

in which Py is pyridyl, Ph stands for methoxy-phenyl, and Z stands for N,N-di-lower alkyl-amino.

6. 2 - (4 - chloro - phenyl)-1-[4-(2-N,N-diethylaminoethoxy)-phenyl]-1-(3-pyridyl)-ethanol.

7. 1 - [4 - (2 - N,N-diethylaminoethoxy)-phenyl]-2-(4-methoxy-phenyl)-1-(3-pyridyl)-ethanol.

8. A compound of the formula

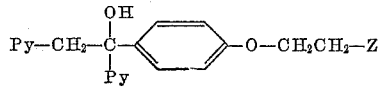

in which Py is pyridyl and Z stands for N,N-di-lower alkyl-amino.

9. 1 - [4-(2-N,N-diethylaminoethoxy)-phenyl]-2-(2-pyridyl)-1-(3-pyridyl)-ethanol.

10. A compound of the formula

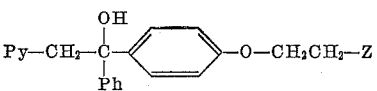

in which Py is pyridyl, Ph stands for methoxy-phenyl, and Z stands for N,N-di-lower alkyl-amino.

11. A compound of the formula

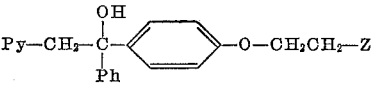

in which Py is pyridyl, Ph stands for chloro-phenyl, and Z stands for N,N-di-lower alkyl-amino.

12. A compound of the formula

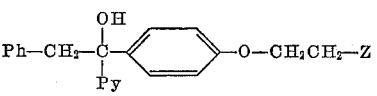

in which Py is pyridyl, Ph stands for chloro-phenyl, and Z stands for N,N-di-lower alkyl-amino.

References Cited in the file of this patent

UNITED STATES PATENTS 2,874,161    Van Campen et al. _____ Feb. 17, 1959